United States Patent [19]

Ara et al.

[11] Patent Number: 5,076,862
[45] Date of Patent: Dec. 31, 1991

[54] METHOD OF MANUFACTURING HEAT RESISTING MAGNETIC SCALE

[75] Inventors: Katsuyuki Ara; Hideyuki Yagi, both of Ibaraki; Hideo Ikeda, Amagasaki; Toshitsugu Ohmura, Amagasaki; Megumi Ohmine, Amagasaki; Masaharu Moriyasu, Amagasaki, all of Japan

[73] Assignees: Japan Atomic Energy Research Institute; Mitsubishi Denki Kabushiki Kaisha, Japan

[21] Appl. No.: 513,967

[22] Filed: Apr. 24, 1990

Related U.S. Application Data

[63] Continuation-in-part of Ser. No. 237,384, Sep. 29, 1988, Pat. No. 4,935,070.

[30] Foreign Application Priority Data

Aug. 31, 1987 [JP] Japan .................. 62-217315
Aug. 31, 1987 [JP] Japan .................. 62-217316
Dec. 29, 1987 [JP] Japan .................. 62-33588

[51] Int. Cl.$^5$ .................................. H01F 1/00
[52] U.S. Cl. .................. 148/122; 148/306; 148/903; 428/611
[58] Field of Search ............ 148/122, 903, 306; 428/611

[56] References Cited

U.S. PATENT DOCUMENTS 2,914,756 11/1959 Heidenhain et al. ............... 340/316
3,243,692 3/1966 Heissmeier et al. ............ 340/870.38
4,510,371 4/1975 Nakamura et al. ............ 219/121.35
4,552,596 11/1985 Ichiyama et al. .................. 428/611
4,871,624 10/1989 Nakamura .......................... 148/903

FOREIGN PATENT DOCUMENTS 48-10655 4/1973 Japan .

OTHER PUBLICATIONS

Kamewaka et al., "A Magnetic Guidance Method for Automated Guided Vehicles", pp. 69-74, 12/87.
Uemura et al., "Application and Precision of Measuring Instrument Using Magnetic Scale", vol. 20, pp. 12-19, 12/87.

Primary Examiner—S. Kastler
Attorney, Agent, or Firm—Leydig, Voit & Mayer

[57] ABSTRACT

A method of manufacturing a heat resisting magnetic scale is disclosed which comprises a manufacturing process in which at least a part of a heat resisting base is heated and immediately cooled for the purpose of fusing the heated part to the base and changing both the magnetic characteristics of the part of the base which has been heated and the Curie point of the part which has been heated is raised to 100° C. or higher.

34 Claims, 5 Drawing Sheets

METHOD OF MANUFACTURING HEAT RESISTING MAGNETIC SCALE

RELATED APPLICATIONS

This is a Continuation-in-Part application of Ser. No. 237,384 filed Sep. 29, 1988, now U.S. Pat. 4,935,070 issued on June 19, 1990.

BACKGROUND OF THE INVENTION

This invention relates to a method of manufacturing a heat resisting magnetic scale for use in high temperature regions.

FIG. 1 is a cross-sectional view of a conventional, prior art, magnetic scale disclosed, for example, in Japanese Patent Publication No. 10655/1973. Referring to the figure, a non-magnetic metal layer 7 such as copper or aluminum which is formed by plating or cladding is applied to the surface of a base 6 which is made of steel or steel alloy such as one sold under the tradename "Elinvar" in the form of a bar with a circular cross-sectional shape. The surface of the non-magnetic metal layer 7 has a magnetic layer 8 made of Cu-Ni alloy applied thereto.

Conventional magnetic scales can be used in, for example, precision machine tools when mounted on the same. A magnetic scale of the type described above first records signals (N, S, magnetization) at a predetermined interval on the magnetic layer 8 in the longitudinal direction of the base 6. Next, a magnetic head (omitted from the illustration) is brought into contact with the magnetic layer 8, and this magnetic head and the base 6 on which the signals are recorded are moved relative to each other. As a result of this, the relative position can be detected by the magnetic head.

As shown in Table 1.2.6 and 6.6.4 of the "Metal Data Book" (edited by Japan Metal Society, 1974), the coefficients of thermal expansion of iron and an iron-alloy such as "Elinvar" (tradename) are each $12.1 \times 10^{-6}$ and $8.0 \times 10^{-6}$. The coefficients of thermal expansion of copper and aluminum are respectively $17.0 \times 10^{-6}$ and $23.5 \times 10^{-6}$. As also shown in Table 6 (6-2) of "Heat Resisting Steel Data" (edited by Special Steel Club, 1965), the coefficient of thermal expansion of Cu-Ni alloy is, for example, $11.9 \times 10^{-6}$ (AISI 21° to 316° C.) on S-816 (AISI No. 671). In a magnetic scale of the type shown in FIG. 1, the coefficient of thermal expansion of the magnetic scale is determined to a substantial extent by the coefficient of thermal expansion of the base 6. However, if a magnetic scale of the type described above is used in a high temperature range of 100°-300° C., the non-magnetic metal layer 7 or the magnetic layer 8 will inevitably be separated from the base 6 due to the difference in the degree of expansion as between the base 6, the non-magnetic metal layer 7 and the magnetic layer 8. This difference is due to the fact that the base 6, the non-magnetic metal layer 7, and the magnetic layer 8 each have different coefficients of thermal expansion.

Furthermore, even if separation of this type does not occur, the degree of expansion of the base 6, the non-magnetic metal layer 7, and the magnetic layer 8 is different due to the difference in their coefficients of thermal expansion causing the base 6, the non-magnetic metal layer 7 and the magnetic layer 8 to be subjected to stress in correspondence with the degree of thermal expansion. As a result of this, the magnetic characteristics of the magnetic layer 8 deteriorate, causing the sensitivity of the magnetic scale itself to be lowered.

It is known that the conventional way of using a magnetic tape or the like as a magnetic scale involves demagnetizing the magnetic tape or the like when subjected to heat. Thus, conventionally magnetic tape or the like is used only at temperatures of, for example, less than 50° C.

SUMMARY OF THE INVENTION

An object of the present invention is to overcome the above-described problems and to provide a method of manufacturing a heat resisting magnetic scale. Heat resisting is intended to describe that the scale cannot be completely demagnetized at high temperatures and that no separation occurs between the layers and/or the base even when the scale is subjected to rapid changes in temperature even at temperatures of above 563° C. Thus, the scale exhibits excellent thermal stability and consistent measuring precision.

The above object of the invention and others are satisfied by a method of manufacturing a heat resisting magnetic scale including a heat resisting base composed of a non-magnetic material selected from the group consisting of non-magnetic stainless steel, copper, zinc, chrome, manganese, aluminum, their alloys and ceramics, and applying a layer of magentic material to the surface of the base. A selected portion of the base and particulate magnetic material is then exposed to a high energy density beam to melt and mix at least a pat of the magnetic material and the base portion which is disposed below the material which is then subjected to immediate and rapid cooling of the melted and mixed portion to raise the curie point of the magnetic material to above 100° C. and to solidify the mixed portion to become integrated with the base, the integrated mixed portion possessing great remanent magnetism sufficient to permit magnetic displacement detection.

Still other objects are satisfied by a method of manufacturing a heat resisting magnetic scale comprising the steps of:

heating a selected target portion of a base with a sweeping, focusable, high energy density beam, he base being composed of a metal selected from the group consisting of stainless steel, copper, zinc, chrome, manganese, aluminum, their alloys, and ceramics, the beam having a focal distance of $0 \pm 100$ mm from the eh surface of the base and providing irradiating energy per unit length of 20-300 kJ/m and a sweeping speed of 0.1-15 m/min.

mixing and fusing the heated target portion with the surrounding portions of he base to form an integral structure, by immediately and rapidly cooling the selected portion and transforming the heated and cooled portion of the base from non-magnetic to magnetic, and increasing the Curie point of the heated portion to above 100° C.

Additional objects of this invention are satisfied by a method of manufacturing a heat resisting magnetic scale comprising the steps of:

heating at least a portion of a heat resisting stainless steel base, the base being selected from a group consisting of stainless steels having a Curie point of less than 100° C. and a first level of magnetism, immediately and rapidly cooling said portion which has been heated to change the Curie point of the heated portion to above 100° C. and the magnetism to a second level, whereby the first and second levels of magnetism of said heated and cooled portion of said base are sufficiently different to permit magnetic displacement detection at temperatures in excess of 100° C.

This invention, in certain respects, relates to changing scale graduation on a metal base composed of, for example, austenitic steel, to detectable graduations on the metal base by manipulating the Curie point of selected portions thereof in converting the lattice structure thereof. For example, the Curie point of a stainless steel (a composition most commonly containing approximately 18% chromium and 8% nickel) is below room temperature, and is usually non-magnetic. However, heating and cooling portions of the base metal, in accordance with the present invention, with a focused energy beam changes the Curie point thereof to even above 563° C. The implications of this change are important. It is well known that the Curie point of a magnetic material defines the temperature at which the material loses its magnetic properties. Accordingly, since a stainless steel composition having a Curie point at or below room temperature exhibits no magnetic properties, it cannot be used in higher temperature environments as a magnetic scale. In contrast, a stainless steel composition having a Curie point at a high temperature, e.g. 563° C., is readily employable in a scale capable of use in high temperature environments because its magnetic properties are not significantly altered until the temperature reaches 563° C. Furthermore, the target beam zone is melted and solidified in a manner to provide an integral structure which resists separation caused by differing thermal expansion coefficients.

Not only does the present invention provide the capability of utilizing a high Curie point magnetic material by altering the crystal lattice of the material, but also, and equally importantly, the present invention increases the Curie Point of a non-magnetic material (at the heated and cooled portions) to a point at which the base material can be used in a scale under high temperature conditions.

It should become evident to the skilled artisan upon review of this specification that high energy beam treatment of selected zones of the base to raise or change the Curie point allows for that portion to possess great remanent magnetism up to the Curie point. Therefore, if the treated portion has a higher Curie point than the base, when the base is non-magnetic at the particular temperature, the treated portion retains its magnetism.

The magnetic scale manufactured according to the present invention can be applied to, for example, precision instruments or rails for the purpose of controlling robots, vehicles, or the like.

PREFERRED EMBODIMENTS OF THE INVENTION

An embodiment of the present invention will now be described with reference to the accompanying drawings.

Figure 1:
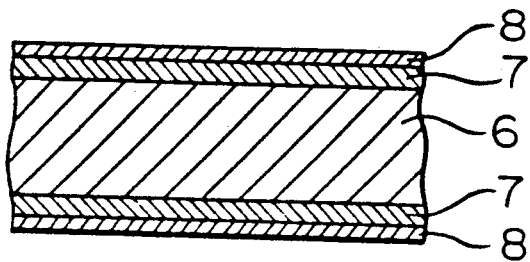
FIG. 1 is a cross-sectional view of a conventional prior art magnetic scale.
Figure 2:
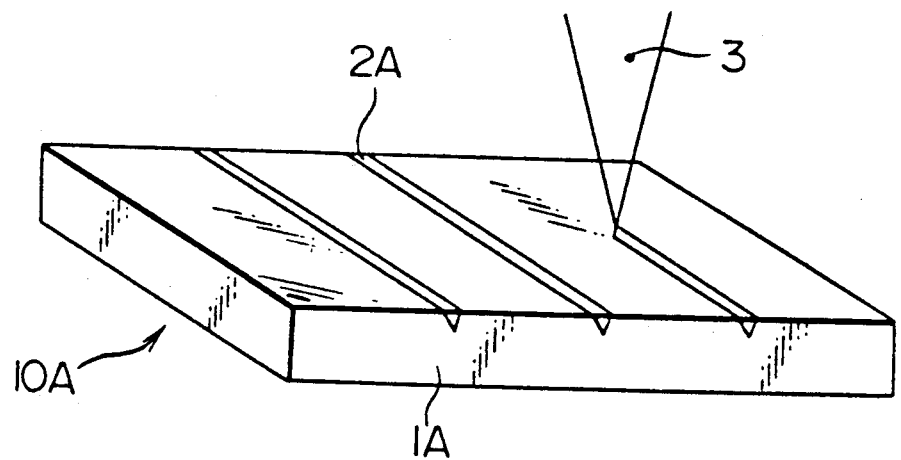
FIG. 2 is a perspective view of a heat resisting magnetic scale according to a first embodiment of the present invention.

FIG. 2 is a perspective view of a heat resisting magnetic scale 10A produced according to an embodiment of the present invention. A plate-like heat resisting base 1A is composed of, for example, a non-magnetic stainless steel plate (such as JIS SUS 304). The base 1A is heated by a heating means such as an electron beam 3 in such a manner that, for example, it is heated at predetermined intervals, and subject to immediate cooling. The portion 2A which is subject to the heating/cooling cycle (hereinafter, portion 2A) exhibits significant changes in its magnetic characteristics. Where the starting material is non-magnetic stainless steel, the portion 2A, after treatment, constitutes a magnetic layer having a Curie point of 100° C. or higher.

Figure 3:
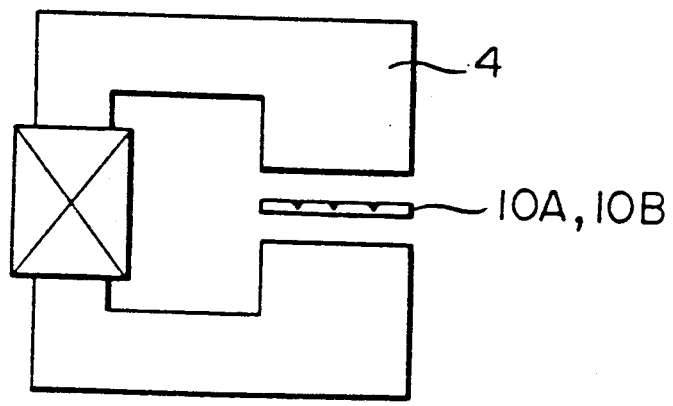
FIG. 3 is a side structural view illustrating a state wherein the heat resisting magnetic scale according to the first embodiment of the present invention is being magnetized.

FIG. 3 is a side structural view illustrating a manner in which the heat resisting magnetic scale 10A is magnetized. The heat resisting magnetic scale 10A is disposed between two poles of an electromagnet 4 which magnetizes the scale.

Figure 4:
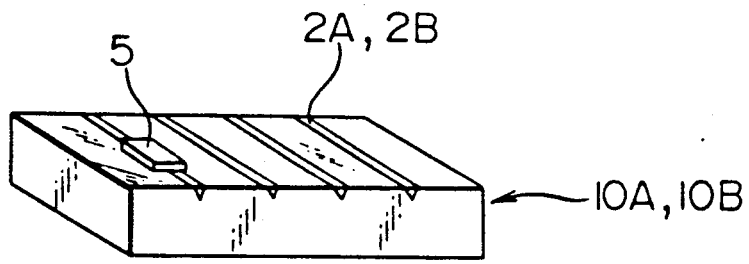
FIG. 4 is a perspective view illustrating a state wherein the displacement is detected by using the heat resisting magnetic scale according to the present invention.

FIG. 4 is a perspective view illustrating a state wherein the displacement on the magnetic scale 10A is detected using a sensor 5, employing a magnetic detection device such as a Hall effect device for detecting the remanent magnetism.

Figure 5:
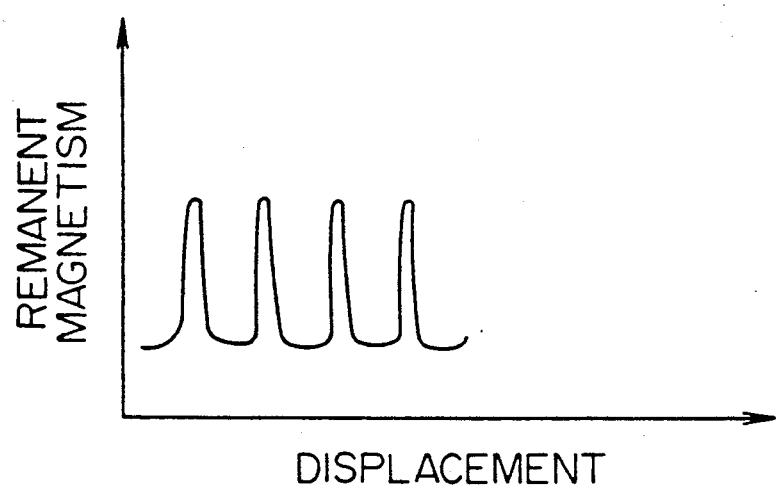
FIG. 5 is a view illustrating the relationship between the degree of magnetization and the displacement, each detected by a method shown in FIG. 4.

FIG. 5 depicts a relationship view illustrating the degree of magnetism detected by a method shown in FIG. 4, wherein the abscissa represents the displacement, while the ordinate represents the degree of remanent magnetism. Once this relationship is established for any particular situation, the displacement is easily determined by the detected magnetism.

Moving now to FIG. 2, when the plate-like base 1A made of non-magnetic stainless steel SUS 304 is irradiated with the electron beam 3 with the output of 1.1 kW, sweeping speed of 1.0 m/min, and the focal distance of +50 mm, the portion of the base 1A irradiated with the electron beam 3 is rapidly heated and melted. When the electron beam 3 is then moved, the portion which has been irradiated with the electron beam 3 rapidly cools and congeals into the solid state. Consequently, the portion which has been swept with the electron beam 3 is subjected to rapid heating and cooling in a linear or planar manner. The heating/cooling cycle generates extreme residual stress in the treated portion.

It is known that when the crystal structure in non-magnetic stainless steel such as SUS 304 is partially changed from a face-centered cubic (fcc) structure to a body-centered cubic (bcc) structure, it is transformed from a non-magnetic to a magnetic material. Therefore, when the plate-like base 1A made of non-magnetic stainless steel SUS 304 is irradiated with the electron beam 3, a linear or planar magnetic layer 2 (a magnetic lattice) is formed on the surface and/or in a portion of the inner portion of the base 1A.

Since the resulting magnetic lattice has great coercive force due to the extreme stress applied thereto, great remanent magnetism is generated when it is magnetized in the manner shown in FIG. 3. Therefore, when the interval for applying the electron beam 3 is determined and a magnetic detection element such as a Hall effect transduction device for detecting the remanent magnetism is used, the graph illustrating the relationship between the displacement and the remanent magnetism (See FIG. 5), can be obtained for detection of displacement.

According to the present invention, since the magnetic layers are disposed in a linear form or a planar form and individually formed by a thermal means at certain intervals in the surface and/or inner portion of the non-magnetic base 1A, the remanent magnetism can be detected in the form of pulses. Consequently, a magnetic scale exhibiting stability and excellent detection sensitivity with respect to the conventional magnetic scale can be obtained. Furthermore, since the portion 2A to be heated is formed by changing the base 1A into a body-centered cubic structure which is magnetic, portion 2A is fused with the base and no separation will occur. Also, since it has the Curie point of 100° C. or higher, a magnetic scale exhibiting excellent heat resistance can be obtained.

Although, in this embodiment, the output of the electron beam is arranged to be 1.1 kW, it may range between 0.1 to 15 kW. If the output of the electron beam is less than 0.1 kW, the base is melted only by significantly lowering the sweeping speed, thereby preventing formation of a magnetic layer. On the other hand, if the same exceeds 15 kW, the sweeping speed must be raised significantly or the width of the portion melted is widened and the body to be melted cannot be cooled sufficiently rapidly to form the sharp magnetic layer. Therefore, the speeds at either extreme are impractical.

A practical sweeping speed of the electron beam is approximately 1.0 m/min. It may range between 0.1 to 15.0 m/min.

The focal distance of the electron beams should be arranged to be +50 mm from the surface of the base. However, the focal distance may range between 0 and ±100 mm. If the focal distance of the electron beam exceeds +100 mm or it is below −100 mm, the focal point of the electron beam is disposed too far away, and thereby prevents melting of the base. Thus, no clearly defined magnetic layer is formed. The preferable irradiating energy per unit length is 20 kJ/m to 300 kJ/m.

Although in the embodiment described above, the electron beam is used for heating, the other means such as laser beams, plasma, or resistance heating may be employed. In the case of a laser beam or other high energy density beams, the considerations concerning the output, the sweeping speed, the focal distance and the like are similar to the case of the electron beam. Furthermore, in the embodiment described above, although the non-magnetic stainless steel SUS 304 is used as the heat resisting base 1, the other type of non-magnetic stainless steel such as SUS 316, SUS 309 or SUS 310 may be used.

As an alternative, base 1 may be composed of a ferromagnetic material. For example, it may be an alloy which can be subjected to hardening or a ferromagnetic material such as ferritic stainless steel SUS 430. (Ferritic, as used herein, is intended to denote alpha ($\alpha$) iron and is not a reference to a metal oxide-ferric oxide ($MeO \cdot F_2O_3$).) Iron, cobalt, nickel, and other ferromagnetic materials, such as martensite stainless steel having excellent heat resistance also can be employed as the base material, so long as the magnetic characteristics of the material are subject to change in accordance with the above-described treatment.

It has been shown that hardness of a carbon steel such as S35C can be significantly improved by the rapid melting and solidifying described above. Therefore, as described above, when the electron beams are applied to the base made of ferromagnetic carbon steel S35C, a layer in the form of a linear shape or a planar shape exhibits altered magnetic characteristics. That is, a magnetic lattice is formed on the surface or the inner portion of the base which possesses great coercive force since the hardness thereof has been raised due to the extreme stress applied thereto. Correspondingly, it generates great remanent magnetism and permits displacement detection when magnetized with the electromagnet 4 in the manner depicted in FIG. 3.

Figure 6:
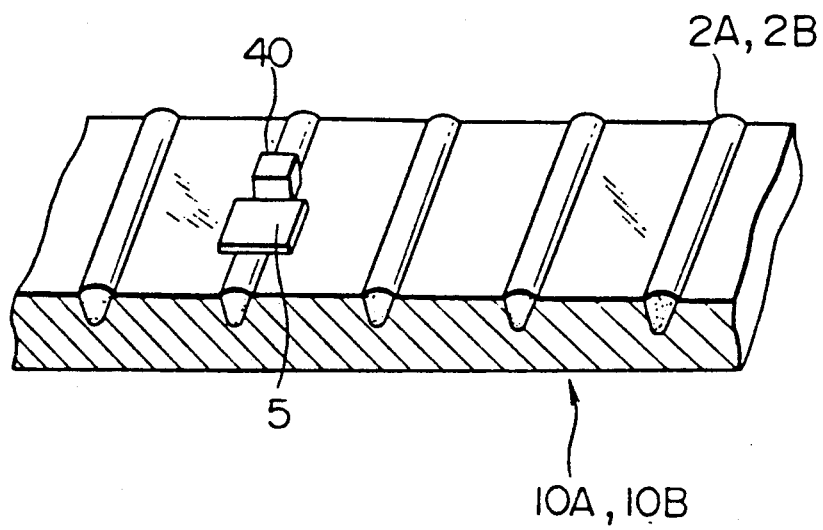
FIG. 6 is a perspective view illustrating a state wherein the displacement is detected by the heat resisting magnetic scale according to the present invention.

Referring briefly now to an alternative remanent magnetism detection procedure to the embodiment described above, it involves an exciting magnet 40 and an element such as a Hall effect device 5 as shown in FIG. 6. Due to the relationship between the displacement and the remanent magnetism, the displacement can be detected.

Furthermore, with the use of an exciting magnetic-type detector, described above, the scale according to the present invention can be used in environments subjected to high temperatures such as 300° to 400° C.

Although in the embodiment described above the plate-like base is used as the heat resisting base, the base may be in the form of a rod. In this case, heating with electron beams can be applied as the rod base is rotated.

Figure 7:
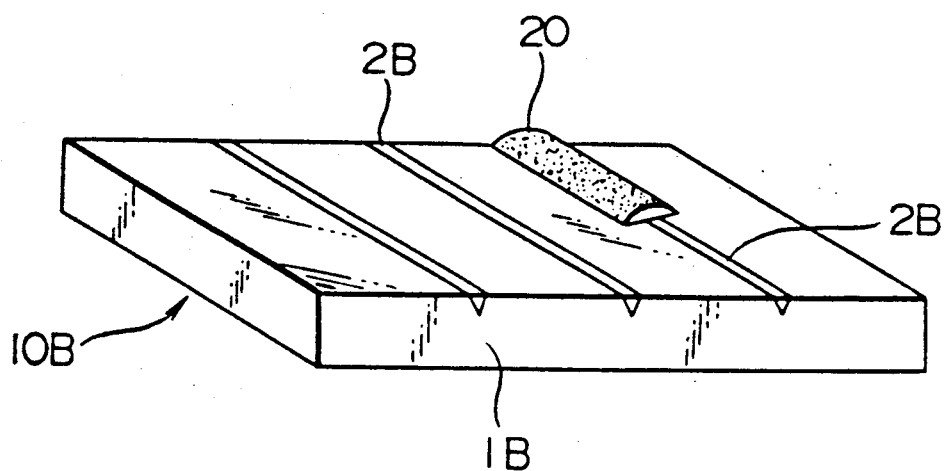
FIG. 7 is a perspective view illustrating a method of manufacturing a heat resisting magnetic scale according to a second embodiment of the present invention.

FIG. 7 is a perspective view of a heat resisting magnetic scale 10B for illustrating a method of manufacturing a heat resisting magnetic scale according to the second embodiment of the present invention. Referring to this figure, a plate-like heat resisting base 1B is made of a non-magnetic material such as austenitic stainless steel (for example JIS SUS 304). A material 20 made of a material which is different from that of the base 1B is formed on a portion 2B of the base 1B, the material 20 being made of discrete magnetic particles such as iron dust. The material 20 is heated by heating means such as laser beams, for example, at predetermined intervals, and is allowed to cool immediately. Thus, the magnetic characteristics of portion 2B, which is generally confined to the zone of beam exposure and which now incorporates the material 20 mixed into the base 1B, are changed. In this case, the portion 2B forms a magnetic layer strip exhibiting a Curie point of 100° C. or higher. Of course, while illustrated as a plate, base 1B can exist in any appropriate physical form such as a bar as referred to above.

A magnetic scale 10B is magnetized in the same manner as the magnetic scale 10A depicted in FIG. 3. As a result, a relationship graph showing the degree of magnetism similar to FIG. 5 can be obtained.

When a particulated magnetic material 20, for example, iron dust, is applied to the base 1B and laser beam 3 (See FIG. 2) is applied to the former, the portion which has been irradiated with the laser beam 3 is rapidly heated and thereby melted. As a result of this, the portion which has been swept with the laser beam 3 is subjected to rapid heating and cooling in a linear or planar manner, fusing the iron dust with the stainless steel base 1B by congealing in the solid state without unnecessary dispersal. Since the iron dust 20 is fused and congealed to the solid state in the plate-like base 1B, a linear or planar magnetic layer (a magnetic lattice) is formed on the surface and in the inner portion of the base 1B affected by the heating. Fusing the lattice to the base prevents their separation even when subjected to rapid and extreme temperature fluctuations.

As with the first embodiment, the remanent magnetism can be generated when the magnetic lattice is magnetized in the manner illustrated in FIG. 3. The graph showing the relationship between the displacement and the remanent magnetism as shown in FIG. 5 can be obtained with use of a Hall effect device so that the displacement can be detected. According to the present invention, very narrow magnetic bodies corresponding to the beam width are individually formed at selected certain intervals in the linear form or a planar form. Therefore, the remanent magnetism can be, as shown in FIG. 5, detected in the form of pulses. Furthermore, since the portion 2B is formed by fusing the magnetic material into the non-magnetic base 1B, it has the Curie point of 100° C. or higher and does not lose magnetism even if it is subjected to high temperatures. Hence, it is provided with excellent heat resistance.

As in the case of the first embodiment, the other non-magnetic stainless steels can be substituted for the SUS 304 which is employed as the non-magnetic material to form a base 1B. Non-magnetic materials such as copper, zinc, chrome, manganese, aluminum, their alloys, or even ceramics, may also be used. For example, as above, the thermal tempering (heating/cooling cycle) of Ni containing material causes the heated portion to become non-magnetic, i.e. inducing a change in the magnetic characteristics. As a result of this, the effect similar to that described above can be obtained. Correspondingly, nickel dust or cobalt dust may be substituted for the iron dust. Nickel provides the additional benefit of excellent corrosion resistance when applied to the surface of the base made of Cu-Zn alloy.

Figure 8:
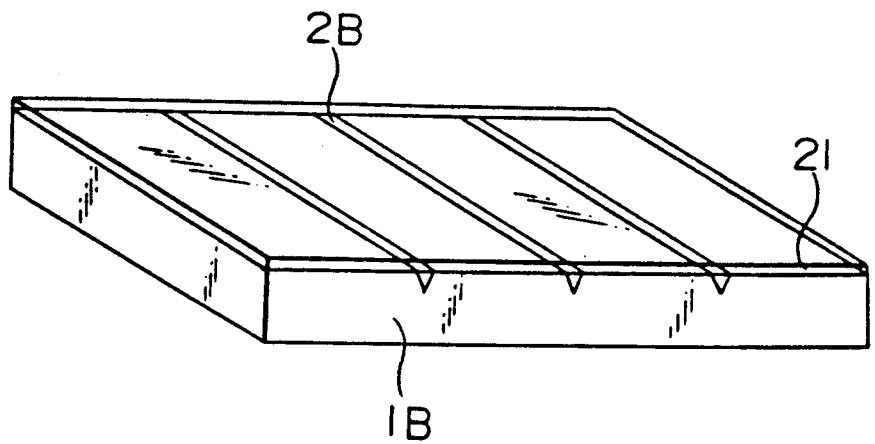
FIG. 8 is a perspective view of a method of manufacturing a heat resisting magnetic scale according to the second embodiment of the present invention.

The particulated material 20 may be applied to the base 1B as shown in FIG. 8 in the form of a thin film 21 by plating or evaporation. When the surface of the plate-like base 1B made of non-magnetic Cu-Zn alloy plated with a thin film 21 made of nickel or a ferromagnetic material is irradiated with laser beams, the portion which has been irradiated is rapidly heated and thereby melted, causing the nickel to be fused on the surface/inner portion of the base 1B. Upon cooling the fused nickel magnetic layer of ferromagnetic material, (magnetic lattices) in a linear or planar shape corresponding to the beam exposed areas possess extreme residual stress. As described above, the resulting magnetic lattice has great coercive forces, great remanent magnetism, when magnetized, and is capable of displacement detection when combined with a detector.

Furthermore, the thin film 21 shown in FIG. 8 may comprise a non-magnetic film such as chrome or molybdenum as an alternative to the above-described ferromagnetic film. If a chrome film is applied by plating to the surface of a base made of non-magnetic austenitic stainless steel SUS 304 and the plated base is irradiated with laser beams, the portion which has been irradiated with the laser beam is rapidly heated and thereby melted. Consistent with the foregoing, although the austenitic stainless steel is a non-magnetic material, it is changed to ferromagnetic ferrite stainless steel by the above described heating-cooling cycle where the magnetic lattice has great coercive force, great remanent magnetism, and thermal stability flux in environments involving temperatures of 300° to 400° C. Finally, it is possible to use a ferromagnetic material for the base so long as the magnetic properties of the fused areas are sufficiently different from those of the base to permit displacement detection.

Figure 9:
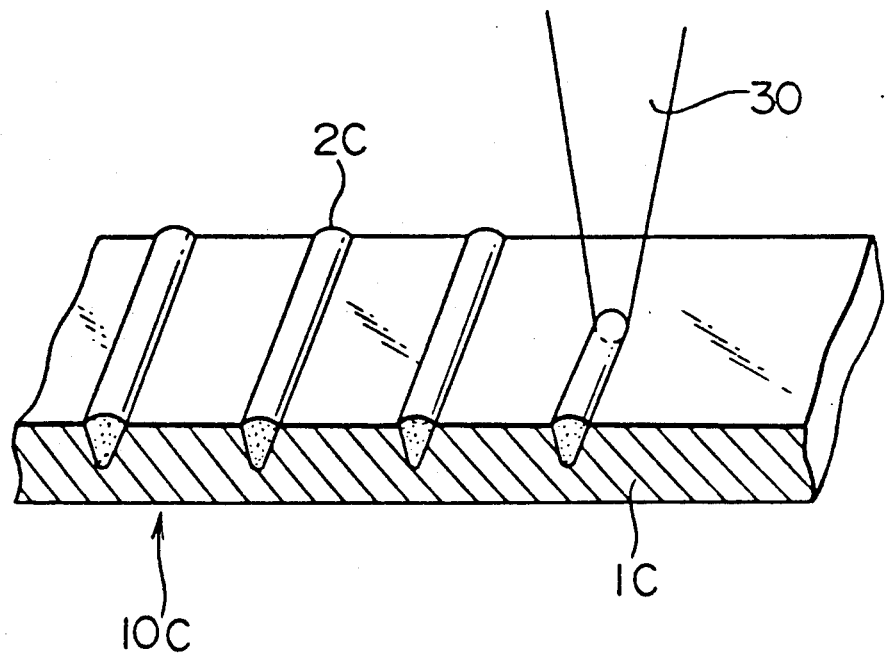
FIGS. 9 and 10 are perspective views of a magnetic scale for illustrating a method of manufacturing a heat resisting magnetic scale according to a third embodiment of the present invention.
Figure 10:
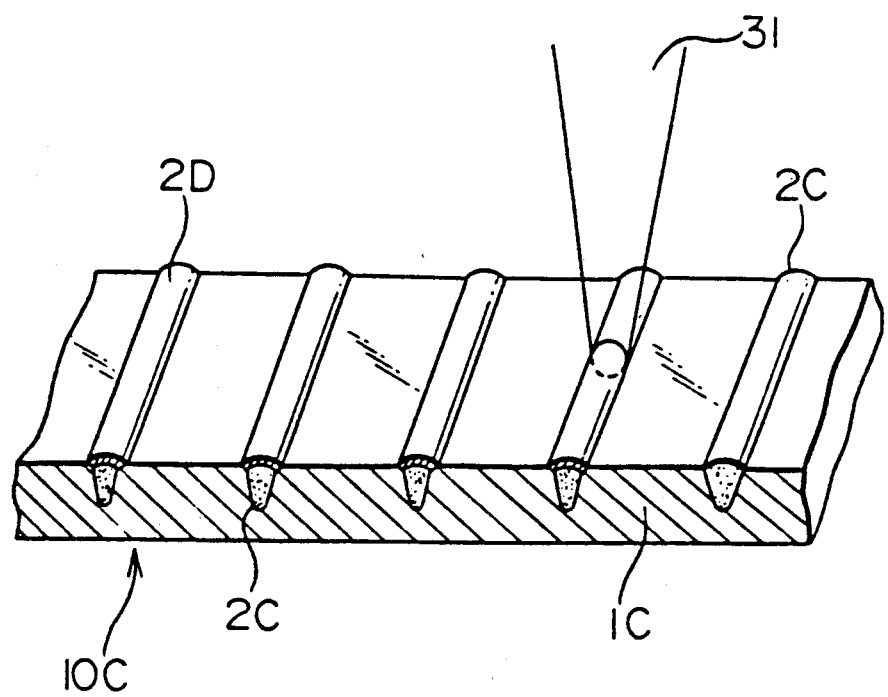
Figure 11:
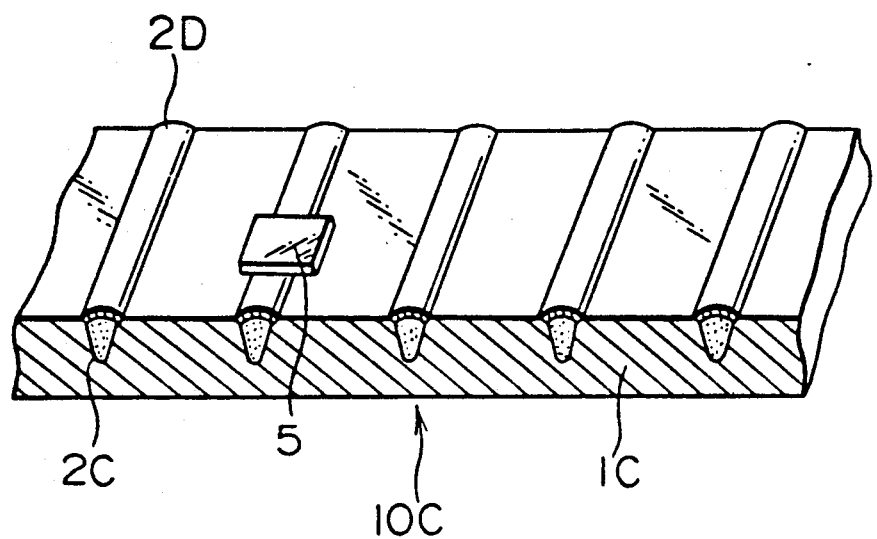
FIGS. 11 and 12 are perspective views of the magnetic scale for illustrating a state where displacement is detected by using the heat resisting magnetic scale according to the present invention.
Figure 12:
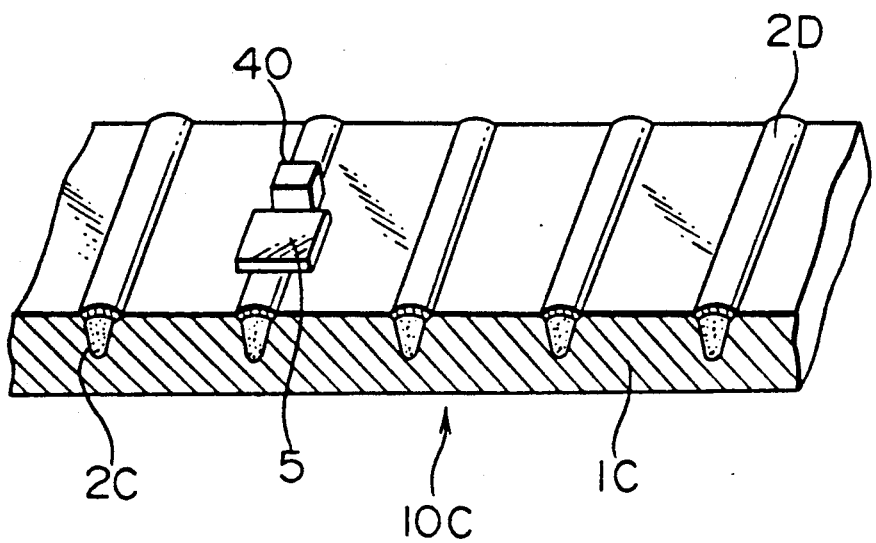

FIGS. 9 and 10 are perspective views of a partial cross-section of the heat resisting magnetic scale 10C, illustrating another embodiment of the present invention. That embodiment is disclosed and fully described in U.S.S.N. 237,384 filed Sep. 29, 1988 U.S. Letters Pat. No. 4,935,070 issued on June 19, 1990 which is incorporated herein by reference.

Variations and modifications of the above described embodiments should now be apparent to the person having ordinary skill in the art. It is intended that such variations and modifications be embraced within the scope and spirit of the following claims.

What is claimed is:

1. A method of manufacturing a heat resisting magnetic scale from a base composed of a non-magnetic material selected from the group consisting of non-magnetic stainless steel, copper, zinc, chrome, manganese, aluminum, their alloys and ceramics, the method comprising the steps of:
   applying a layer of magnetic material to the surface of the base,
   exposing a selected portion of the base and magnetic material to a high energy density beam to melt and mix at least a part of the magnetic material and the base portion which is disposed below the material,
   immediately and rapidly cooling the melted and mixed portion to raise the Curie point of the magnetic material to above 100° C. and to solidify the mixed portion to become integrated with the base, the integrated mixed portion possessing great remanent magnetism sufficient to permit magnetic displacement detection.

2. The method according to claim 1 wherein the base is composed of stainless steel selected from a group consisting of non-magnetic austenitic stainless steel, ferromagnetic ferritic stainless steel and ferromagnetic, martensite stainless steel.

3. The method according to claim 1 wherein the magnetic material is a ferromagnetic material and the Curie point of the magnetic material is above 300° C.

4. The method according to claim 3 wherein the ferromagnetic material is a metal that is selected from a group consisting of iron, cobalt and nickel.

5. The method according to claim 3 wherein the magnetic material is particulated magnetic metal selected from a group consisting of iron, cobalt, nickel, and alloys thereof.

6. The method according to claim 3 wherein said ferromagnetic material is a thin film that is applied to the surface of said base by means of plating or evaporation.

7. The method according to claim 1 wherein the magnetic material is a ferromagnetic material and the base is made of a heat resisting alloy made of elements selected from the group consisting of copper, zinc, aluminum, iron, and chrome.

8. A method of manufacturing a heat resisting magnetic scale suitable for use in a high temperature environment comprising:
   selecting a heat resisting base composed of a non-magnetic material selected from the group consisting of ferritic, non-magnetic stainless steel, iron, copper, zinc, chrome, manganese, molybdenum, aluminum, their alloys, and ceramics,
   placing a metallic material on a base where the metallic material has differing magnetic properties from that of the base;
   heating and cooling at graduated locations a selected portion of said metallic material and a selected portion of the base under conditions in which the portions are joined and provide integrated graduations corresponding to the graduated locations having sufficiently different magnetic characteristics than the base to permit magnetic displacement detection and having a Curie point of in excess of 100° C.

9. The method according to claim 8 wherein the metallic material is non-magnetic chrome or molybdenum and the base is non-magnetic austenitic stainless steel.

10. The method according to claim 9 wherein the metallic material is a thin film applied to the surface of said base by means of plating or evaporating.

11. The method according to claim 8 wherein the base is non-magnetic stainless steel.

12. The method according to claim 8 wherein the metallic material is a powder selected from the group consisting of magnetic zinc, iron, chrome, nickel, manganese, or an alloy thereof and said base is a non-magnetic material.

13. A method of manufacturing a heat resisting magnetic scale suitable for use in a high temperature environment comprising:
   selecting a heat resisting base composed of a magnetic material selected from the group consisting of magnetic stainless steel, iron, nickel, cobalt, and their alloys,
   placing a metallic material on a base where the metallic material has differing magnetic properties from that of the base;
   heating and cooling at graduated locations a selected portion of said metallic material and a selected portion of the base under conditions in which the portions are joined and provide integrated graduations corresponding to the graduated locations having different magnetic characteristics than the base to permit magnetic displacement detection and having a Curie point of in excess of 100° C.

14. The method according to claim 13 wherein said base is magnetic and said powder is non-magnetic.

15. The method according to claim 14 wherein the powder is copper, aluminum, or an alloy thereof.

16. A method of manufacturing a heat resisting magnetic scale comprising:
   heating a selected target portion of a base with a sweeping, focusable, high energy density beam, the base being composed of a metal selected from the group consisting of stainless steel, copper, zinc, chrome, manganese, aluminum, their alloys, and ceramics, the beam having a focal distance of 0 ±100 mm from the surface of the base and providing irradiating energy per unit length of 20–300 kJ/m and a sweeping speed of 0.1–15 m/min.
   mixing and fusing the heated target portion with the surrounding portions o the base to form an integral structure,
   by immediately and rapidly cooling the selected portion and transforming the heated and cooled portion of the base from non-magentic to magnetic, and
   increasing the Curie point of the heated portion to above 100°0 C.

17. The method according to claim 16 wherein he heat resisting base is made of austenitic stainless steel possessing a face centered cubic crystal lattice and converting the crystal lattice to body-centered cubic.

18. The method according to claim 16 wherein eh stainless steel is selected from a group consisting of non-magnetic austenitic stainless steel, ferromagnetic ferritic stainless steel and ferromagnetic martensite stainless steel.

19. The method according to claim 16 wherein the heat resisting base is composed of a ferromagnetic material.

20. The method according o claim 19 wherein the ferromagnetic material is a carbon steel and further comprising the sep of hardening the target portion by heating.

21. The method according to claim 19 wherein he ferromagnetic material is an alloy the target portion of which is softened by heating.

22. The method according o claim 16 wherein the heating is conducted with electron beams having a output of 0.1–15 kW.

23. The method according to claim 16 wherein the heating is conducted with laser beams.

24. The method according to claim 16 further including the step of applying a layer of particulated material having different magentic properties form the base, on the base prior to beam heating where the particulated material is melted, mixed with and fuses to the base.

25. The method according to claim 24 wherein eh particulated material is selected from the group consisting of iron dust, nickel dust and cobalt dust.

26. A method according to claim 16 further including the step of applying a thin layer of ferromagnetic material having magentic properties measurably different from those of the base after mixing and fusing in the target portions.

27. The method according o claim 26 wherein said scale is suitable for use in high temperature environments, further comprising the step of applying a particulated magnetic material to the surface of the base and where the heating and cooling of the target portions is achieved by exposing selected portions to a high energy density beam to melt and mix the particulated magentic material and the base in the target portion.

28. A method of manufacturing a heat resisting magnetic scale comprising the steps of:
   heating at least a portion of a stainless steel base wherein the stainless steel base is selected from a group consisting of stainless steels having a lattice structure providing magnetic characteristics having a Curie point of at least 100° C. and stainless steels having another lattice structure providing non-magnetic characteristics;

immediately and rapidly cooling the portion which has been heated, whereby the heating and cooling steps convert the lattice structure of the heated and cooled portion from one to the other lattice structure and thereby change the portion from one to the other magnetic characteristic.

29. A method of manufacturing a heat resisting magnetic scale comprising the steps of:

heating at least a portion of a heat resisting stainless steel base, the base being selected from a group consisting of stainless steels having a Curie point of less than 100° C. and a first level of magnetism, immediately and rapidly cooling said portion which has been heated to change the Curie point of the heated portion to above 100° C. and the magnetism to a second level, whereby the first and second levels of magnetism of said heated and cooled portion of said base are sufficiently different to permit magnetic displacement detection at temperatures in excess of 100° C.

30. A magnetic scale produced according to the method of claim 1.

31. A magnetic scale produced according to the method of claim 8.

32. A magnetic scale produced according to the method of claim 13.

33. A magnetic scale produced according to the method of claim 16.

34. A magnetic scale produced according to the method of claim 29.

* * * * *

UNITED STATES PATENT AND TRADEMARK OFFICE
CERTIFICATE OF CORRECTION

PATENT NO. : 5,076,862

DATED : December 31, 1991

INVENTOR(S) : Ara et al.

It is certified that error appears in the above-identified patent and that said Letters Patent is hereby corrected as shown below:

Claim 2, column 8, line 58, change "martensite" to --martensitic--.

Claim 8, column 9, line 27, delete "sufficiently".

Claim 16, column 10, line 11, change "o" to --of--;

line 18, change "100°0C" to --100°C--.

Claim 17, column 10, line 19, change "he" to --the--;

line 21, change "face centered" to --face-centered--.

Claim 18, column 10, line 23, change "eh" to --the--;

line 26, change "martensite" to --martensitic--.

Claim 20, column 10, line 31, change "o" to --to--;

line 33, change "sep" to --step--.

Claim 21, column 10, line 35, change "he" to --the--;

Claim 22, column 10, line 38, change "o" to --to--.

Claim 24, column 10, line 45, change "form" to --from--.

Claim 25, column 10, line 48, change "eh" to --the--.

UNITED STATES PATENT AND TRADEMARK OFFICE
CERTIFICATE OF CORRECTION

PATENT NO. : 5,076,862

DATED : December 31, 1991

INVENTOR(S) : Ara et al.

It is certified that error appears in the above-identified patent and that said Letters Patent is hereby corrected as shown below:

Claim 27, column 10, line 56, change "o" to --to--.

Signed and Sealed this

Twentieth Day of April, 1993

Attest:

MICHAEL K. KIRK

Attesting Officer

Acting Commissioner of Patents and Trademarks